US009523206B2

United States Patent
Frisina

(10) Patent No.: US 9,523,206 B2
(45) Date of Patent: Dec. 20, 2016

(54) CEMENT POURING DEVICE

(71) Applicant: Dominic Charles Frisina, Meadville, PA (US)

(72) Inventor: Dominic Charles Frisina, Meadville, PA (US)

( * ) Notice: Subject to any disclaimer, the term of this patent is extended or adjusted under 35 U.S.C. 154(b) by 7 days.

(21) Appl. No.: 14/810,764

(22) Filed: Jul. 28, 2015

(65) Prior Publication Data

US 2016/0024806 A1    Jan. 28, 2016

Related U.S. Application Data

(60) Provisional application No. 62/029,916, filed on Jul. 28, 2014.

(51) Int. Cl.
*B65G 11/18* (2006.01)
*E04G 21/04* (2006.01)

(52) U.S. Cl.
CPC ........... *E04G 21/0481* (2013.01); *B65G 11/18* (2013.01)

(58) Field of Classification Search
CPC ... E04G 21/0481; B65G 11/02; B65G 11/023; B65G 11/026; B65G 11/12; B65G 11/123; B65G 11/126; B65G 11/18; B65G 11/183; B65G 11/186
USPC ........................................................ 193/10
See application file for complete search history.

(56) References Cited

U.S. PATENT DOCUMENTS

| | | | | |
|---|---|---|---|---|
| 4,007,821 A * | 2/1977 | Schiffelbein | ............ | E04G 21/04 193/10 |
| 4,068,771 A * | 1/1978 | Zimmerman | ........... | E02F 3/401 37/403 |
| 5,182,057 A * | 1/1993 | Johnson | ................ | E02F 3/3414 222/185.1 |
| 5,692,875 A * | 12/1997 | Boman | .................. | E02F 3/404 37/903 |
| 5,829,949 A * | 11/1998 | Brown | ...................... | E02F 3/40 141/10 |
| 6,578,297 B1 * | 6/2003 | Forsberg | .................. | E02F 3/40 172/817 |
| D630,653 S * | 1/2011 | Meritt | ........................... | D15/19 |
| 7,934,899 B2 * | 5/2011 | Downing | ................. | E02F 3/40 37/411 |
| 2005/0169739 A1 * | 8/2005 | Raley | ..................... | E02F 3/962 414/724 |
| 2007/0160452 A1 * | 7/2007 | Kerwin | ................ | E04G 21/025 414/722 |
| 2016/0039606 A1 * | 2/2016 | Seaton | ................ | B65G 11/123 193/15 |

* cited by examiner

*Primary Examiner* — Mark A Deuble
(74) *Attorney, Agent, or Firm* — Dominic A. Frisina

(57) ABSTRACT

A cement pouring device may include an elongate vessel supported by a frame. The frame may enable the vessel to cooperate with and be transported by a vehicle such as a skid steer. Due to the elongate shape of the device, it may be particularly suitable for depositing a cement charge at a distal pour site that would be difficult to access otherwise, or may only have been accessible manually with a conventional wheel barrow and shovel. This may be particularly advantageous in smaller pour jobs where equipment such as cement pumps are impractical or economically infeasible.

19 Claims, 9 Drawing Sheets

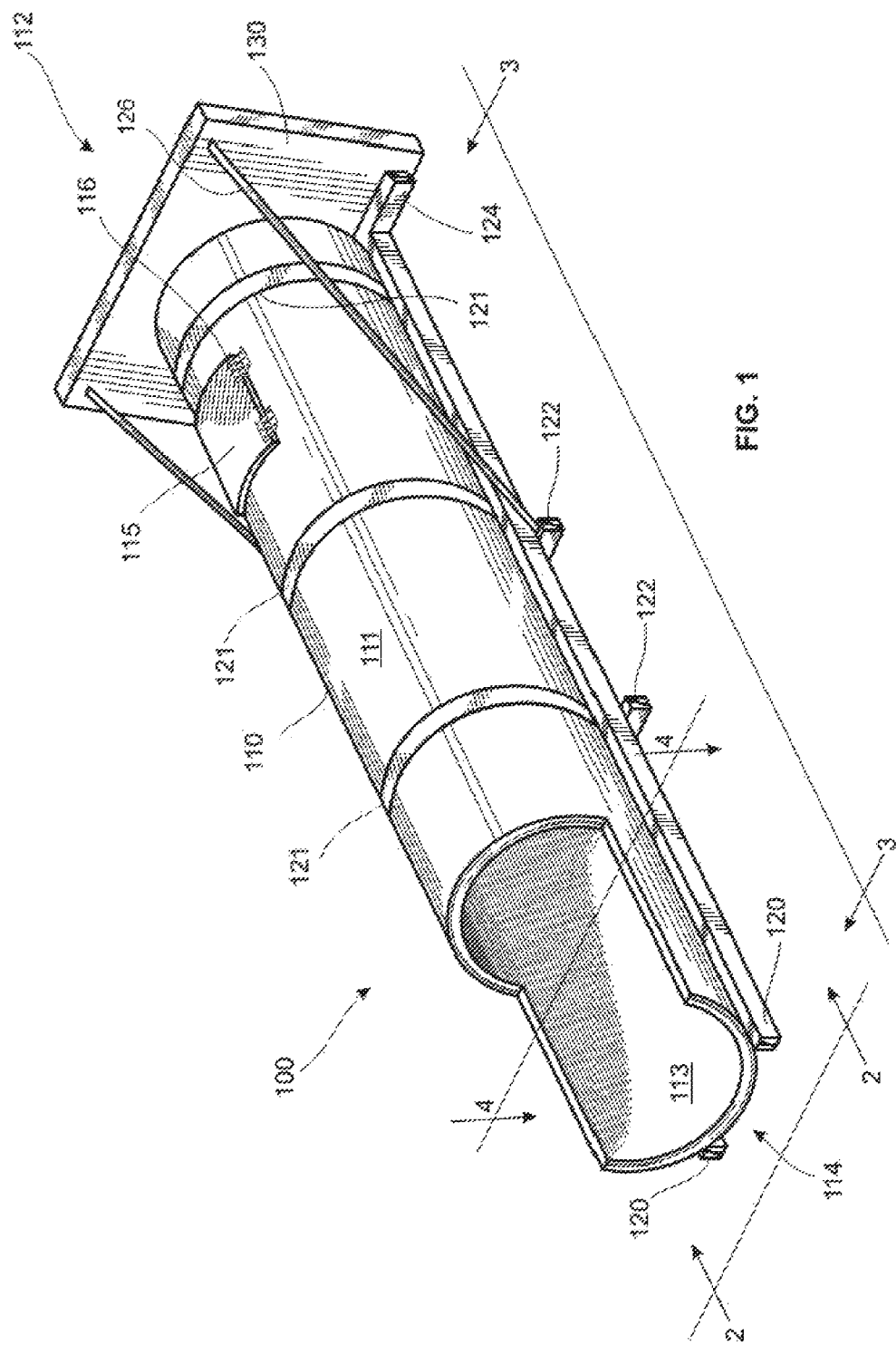

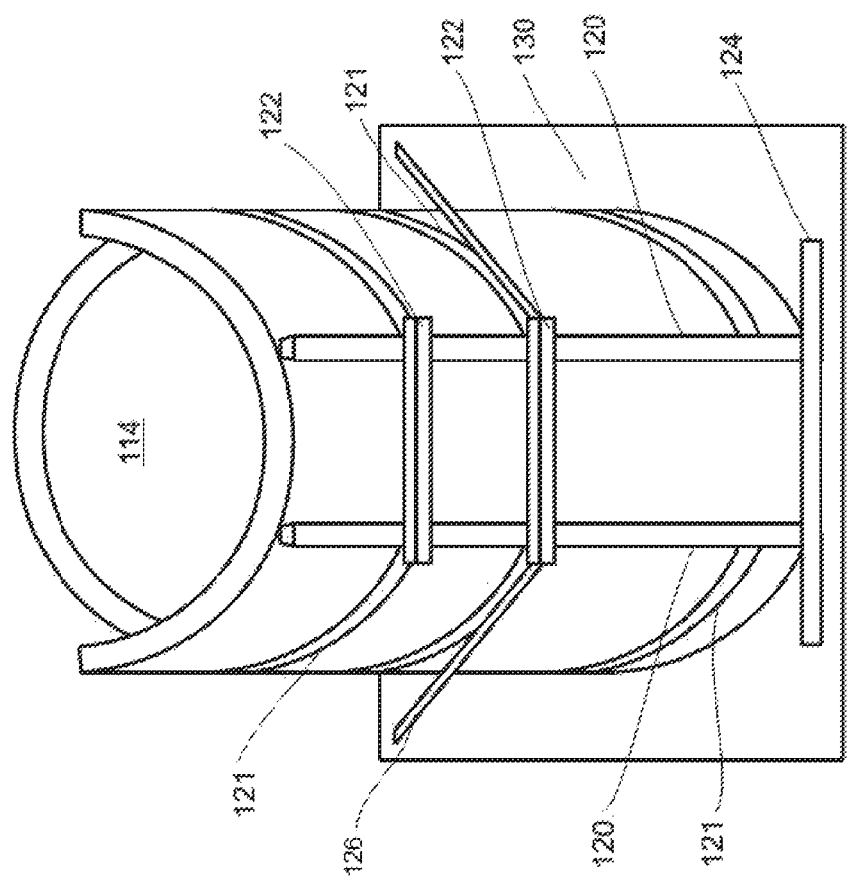

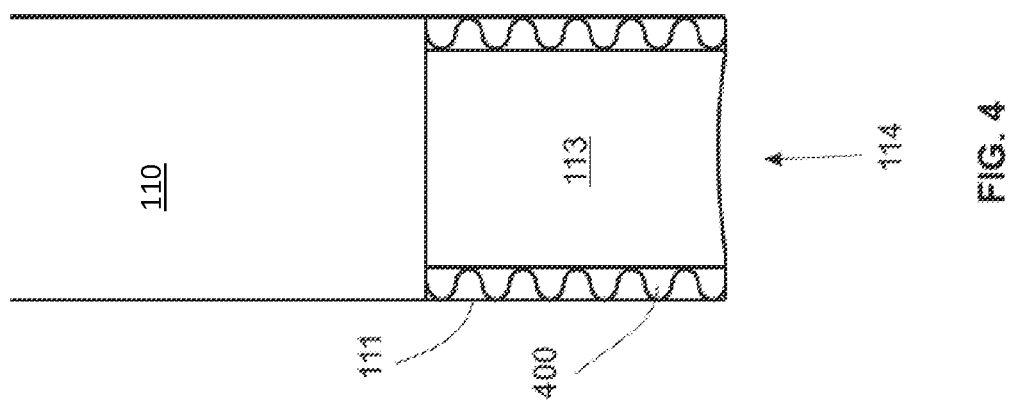

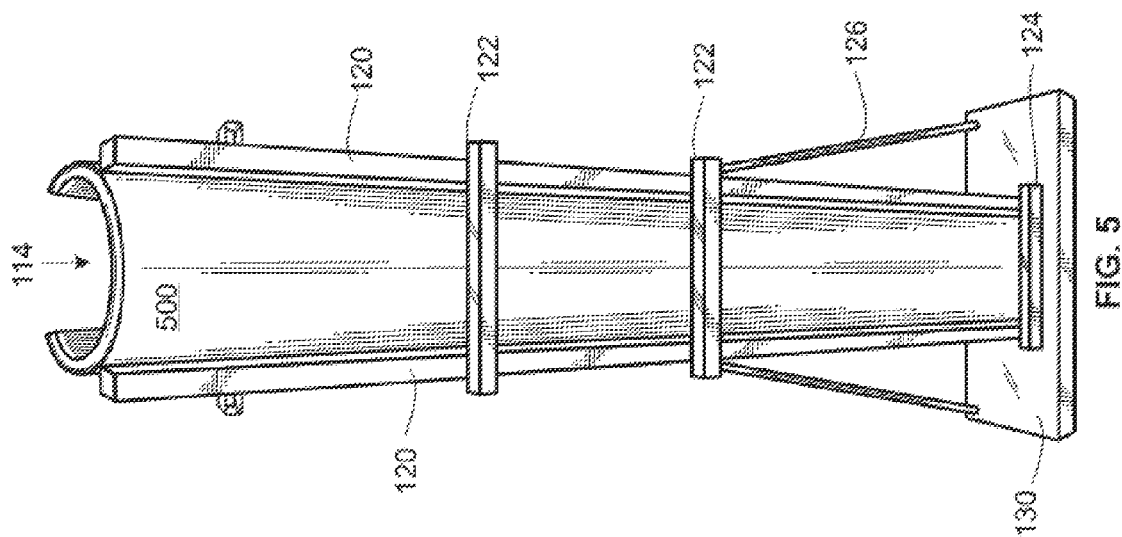

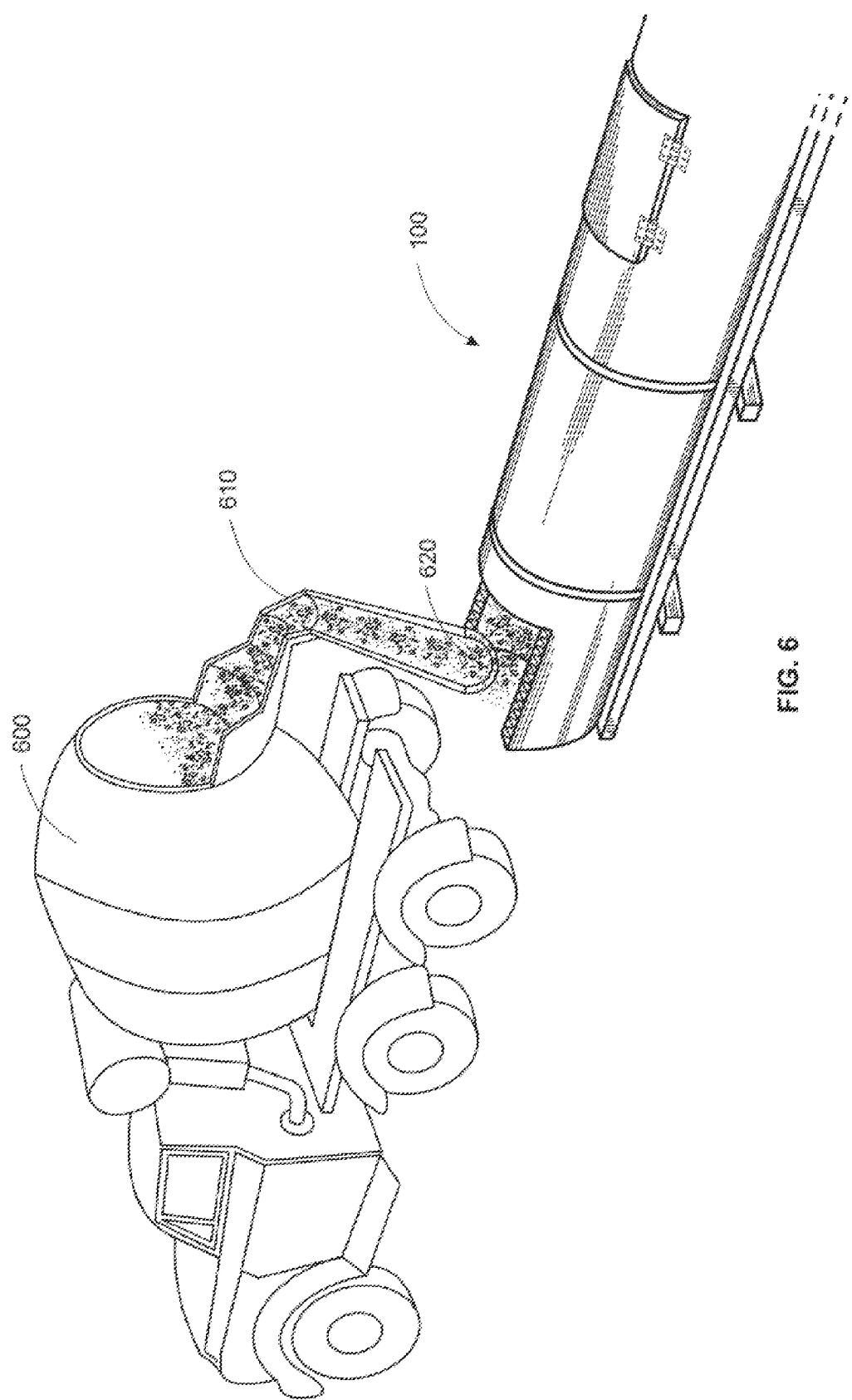

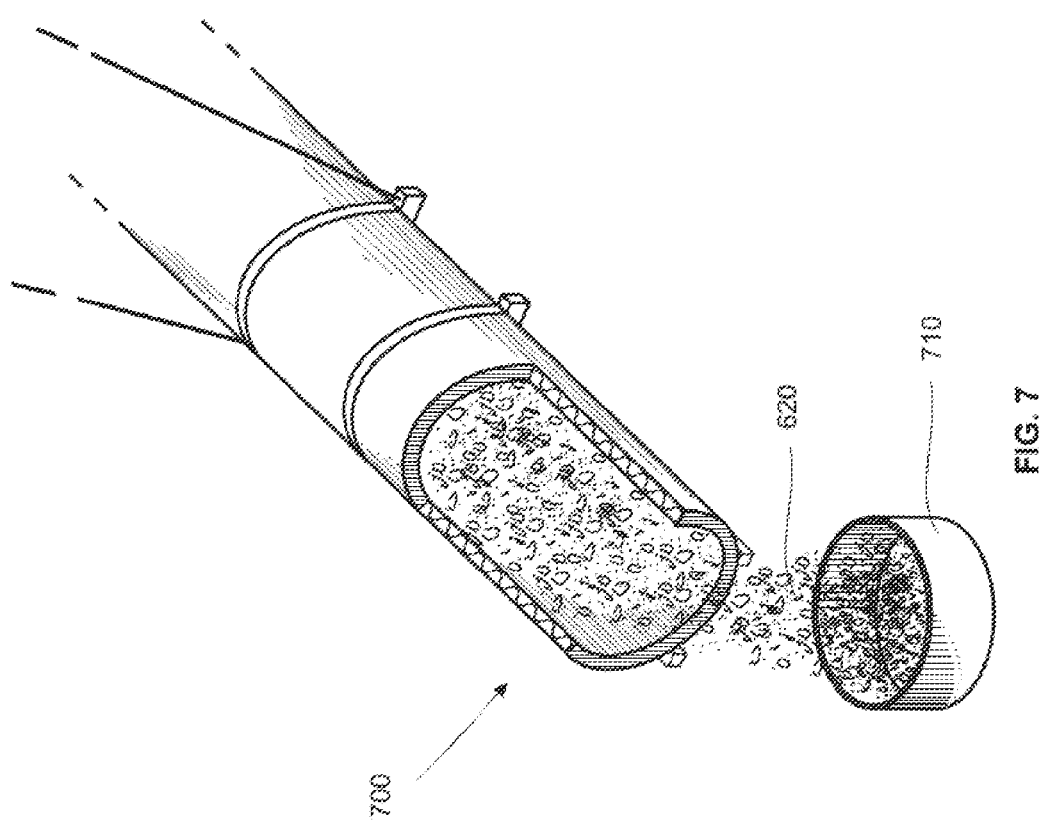

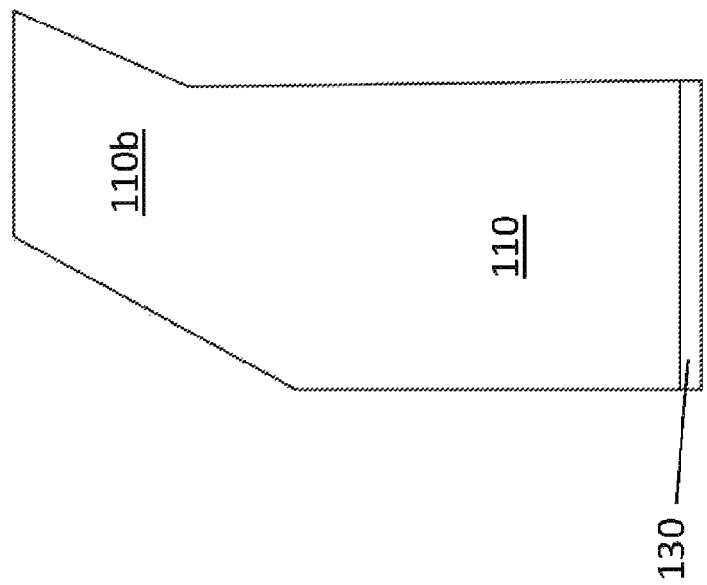
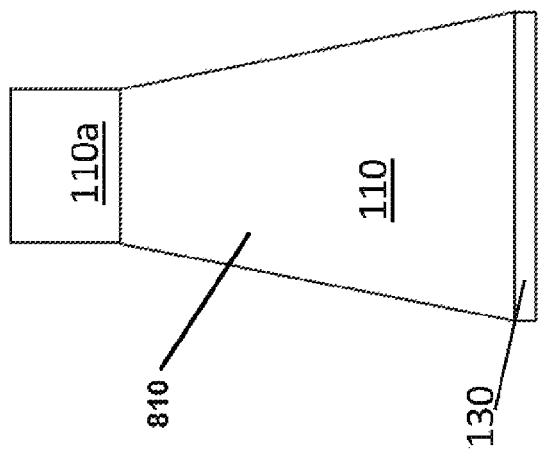
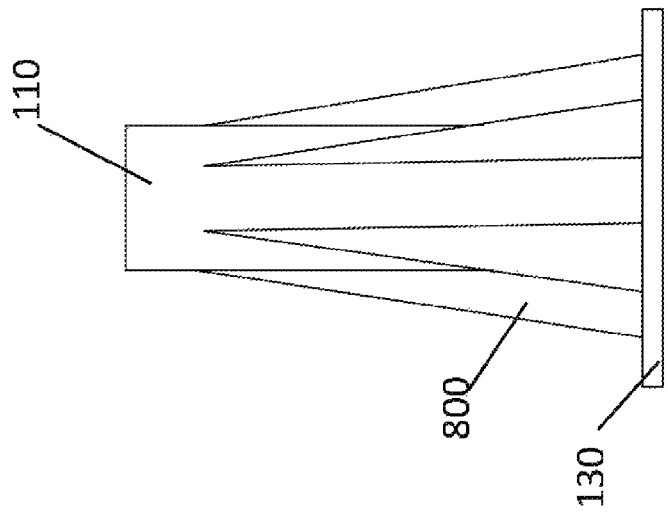

CEMENT POURING DEVICE

The present application claims the benefit of U.S. Provisional Patent Application No. 62/029,916 filed Jul. 28, 2014, and is incorporated herein by reference in its entirety.

I. BACKGROUND OF THE INVENTION

A. Field of Invention

Embodiments may generally relate to devices for containing, transporting, and/or pouring cement.

B. Description of the Related Art

Devices for pouring cement are known in the art, as are devices for traversing a distance to deposit wet cement at a location remote from a cement mixer or cement truck. However, known devices and methods have certain disadvantages. For instance, one common solution is to have cement chute extensions which can be attached to the chute of a cement truck. In theory this is a workable solution, but in reality many cement truck operators carry a fixed number of chutes and buyers have little or no leverage to have extra chutes accompany the truck. Furthermore, buying extra cement chutes is costly and may be impractical or cost prohibitive for small contractors. Additionally, by its nature cement does not flow easily and requires a significant decline in order for gravity to cause it to flow. Thus, in some instances it may be impossible to traverse the distance from a cement truck to a pour site using chutes. Moreover, chutes operating with a gravity-driven flow will flow continuously, which would be problematic for pouring discrete forms such as piers. In this context, a continuous flow would result in spillage as the chute is moved from one pier form to the next. Cement pumps are known for moving cement across a distance that cannot be traversed with a chute; however, cement pumps are also very costly and are often not economically feasible for small and medium sized jobs.

Some embodiments of the present invention may provide one or more benefits or advantages over the prior art.

II. SUMMARY OF THE INVENTION

Some embodiments may relate to a cement pouring device comprising: an elongate vessel adapted to contain a wet cement mixture and having a frontal opening for dispensing the wet cement mixture; and a mounting plate disposed at a back end of the elongate vessel and adapted to engage a lift vehicle.

In some embodiments the mounting plate and the elongate vessel form a unitary structure.

Embodiments may also include a support frame adapted to engage the elongate vessel in a fixed relation and adapted to stiffen the elongate vessel against flexion.

In some embodiments the support frame and elongate vessel form a unitary structure.

Embodiments may also include a mounting plate disposed at a rear of the device and adapted to reversibly engage a skid steer such that the skid steer may carry the device.

According to some embodiments the frontal opening of the elongate vessel is pitched upward relative to the mounting plate.

According to some embodiments the elongate vessel further comprises a reservoir portion at a rear of the elongate vessel, the reservoir portion being adapted to provide extra cement holding capacity by expanding the elongate vessel at the reservoir portion with respect to a volume of the frontal opening.

According to some embodiments the elongate vessel further comprises a cleanout window disposed in a top wall of the elongate vessel.

Some embodiments may also include a cover attachable to the elongate vessel and adapted to close the cleanout window.

According to some embodiments the support frame includes a pair of longitudinal support beams spaced apart to form a pocket adapted to receive the elongate vessel and adapted to stiffen the elongate vessel against lateral flexion perpendicular to a longitudinal axis of the elongate vessel.

According to some embodiments the support frame includes a plurality of lateral supports perpendicular to the longitudinal supports and tying the longitudinal supports together.

According to some embodiments the plurality of lateral supports comprise medial lateral supports disposed about a midsection of the elongate vessel.

According to some embodiments the plurality of lateral supports comprise at least one rear lateral support joined to the mounting plate and defining a ledge vertically supporting the longitudinal supports, wherein the longitudinal supports are joined to the rear lateral support.

According to some embodiments the plurality of lateral supports comprise at least one rear lateral support joined to the mounting plate and forming a T joint with an end of each longitudinal support.

According to some embodiments the plurality of lateral supports comprise a pair of rear lateral supports formed by bending ends of the longitudinal supports at a right angle, the rear lateral supports being joined to the mounting plate.

Some embodiments may also include a pair of oblique supports each having one end joined to an end of a lateral support, and an end joined to the mounting plate, and wherein each oblique support is oriented at an oblique angle relative to a longitudinal axis of the elongate vessel.

According to some embodiments the elongate vessel comprises a pair of coaxial tubes spaced apart and joined by a medial corrugated support structure.

According to some embodiments the frontal opening includes a chute, the chute having an upper hemisphere of the elongate vessel omitted.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 1 is a perspective view of a cement pouring device;

FIG. 2 is a front view of the cement pouring device of FIG. 1 according to line 2-2 of FIG. 1;

FIG. 4 is a partial top view of the cement pouring device of FIG. 1 according to line 4-4 showing the front end of the device;

FIG. 5 is a bottom perspective view of the cement pouring device of FIG. 1;

FIG. 6 is a view of a cement pouring device being loaded with cement;

FIG. 7 is a view of a cement pouring device pouring cement in a form;

FIG. 8A is a two-dimensional illustration of an embodiment having a built-in unitary frame;

FIG. 8B is a two-dimensional illustration of an embodiment having a conical vessel serving as a unitary frame; and FIG. 8C is a two-dimensional illustration of an embodiment having an irregular cylindrical vessel.

IV. DETAILED DESCRIPTION OF THE INVENTION

Figure 3A:
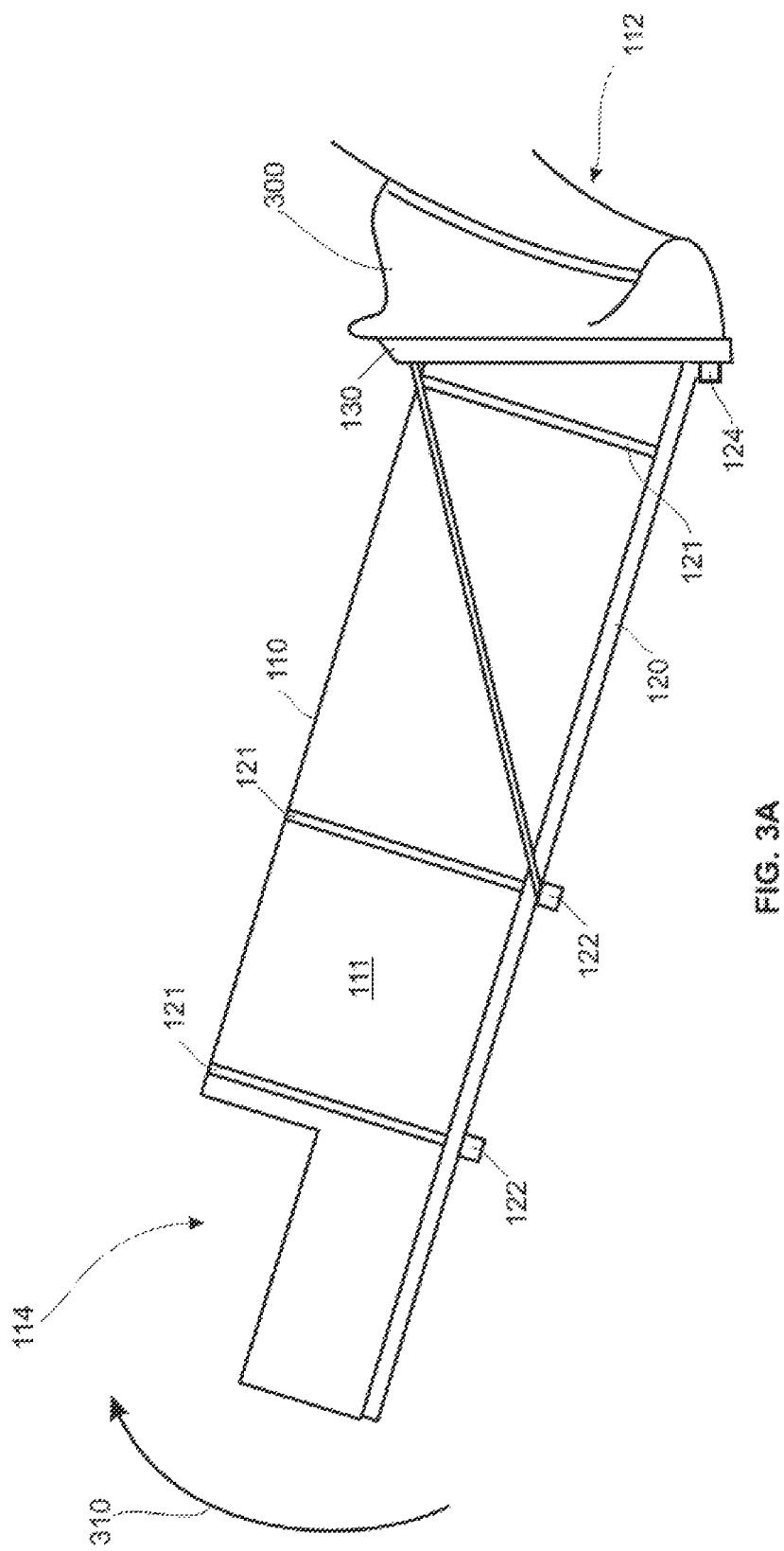
FIG. 3A is a side view of the cement pouring device of FIG. 1 according to line 3-3 of FIG. 1 where the front end of the device is tilted upward.

Embodiments of the invention relate to devices and methods for transporting wet cement and depositing it in a selected location at a distance from an operator of the device. In general, a typical but non-limiting embodiment may include an elongate vessel suitable for containing pre-mixed wet cement. Suitable vessels may be generally tubular and may have one open end. The device may include structural support elements comprising a frame adapted to engage a skid steer, forklift truck, or similar lift vehicle to pick up and transport the device from, for instance, a cement truck to a pour site. The pitch of the device may be adjustable downward by the forklift so that the wet cement pours out of the open end of the elongate vessel and is deposited at a predetermined pour site.

Referring now to the drawings wherein the showings are only for purposes of illustrating embodiments of the invention and not intended to limit the same, FIG. 1 is a perspective view of an embodiment 100. The embodiment shown here includes an elongate vessel 110 having a frontal opening 114, and a closed back end 112. The back end 112 of the elongate vessel is joined to a mounting plate 130, which is specially adapted to cooperate with a skid steer. It will be understood by those skilled in the art that skid steers are adapted to receive and change out a variety of attachments such as lifting forks, buckets, augers and the like. This is possible through the use of standardized attachment plates. The mounting plate 130 shown here is such a standardized attachment plate.

With continuing reference to FIG. 1, the embodiment 100 further includes a pair of longitudinal supports 120 running substantially the length of the elongate vessel 110. It is also contemplated that the longitudinal supports may provide sufficient support by stopping short of the frontal opening 114 end of the device. Depending upon the strength of materials chosen for a particular embodiment, this may be by ten percent or more of the total length of the device 100. The longitudinal supports 120 are tied together by a plurality of medial lateral supports 122 disposed around the middle of the length of the elongate vessel 110, and by a rear lateral support 124. The rear lateral support of this embodiment 100 also functions to join the elongate vessel 100 to the back mounting plate 130 while providing added lateral support by extending further from the midline of the vessel 110 than the medial lateral supports 122. As shown, the rear lateral support 124 forms a T joint with the ends of the longitudinal supports 120 as opposed to lying across the underside the longitudinal supports. While a T joint may provide certain advantages, it is not a requirement. For instance, rather than joining separate parts in a T, the T may be unitary, for instance, a unitary cast part. Other embodiments are contemplated wherein the rear lateral support 124 is joined to the mounting plate 130 forming a ledge vertically supporting the longitudinal supports 120 at their ends in addition to tying the longitudinal supports 120 together laterally. In still another embodiment, the ends of the longitudinal supports 120 are bent at right angles to form an L shape. Thus, the spine of the L shape runs parallel to a longitudinal axis of the elongate vessel 110, and the base of the L shape runs parallel to the surface of the mounting plate 130 to which it is joined thus forming the rear lateral support 124. Other embodiments may be a combination of one or more of the foregoing rear lateral support structures. In still other embodiments the rear lateral support 124 may be omitted entirely.

With further regard to FIG. 1, the illustrated embodiment 100 further includes a pair of optional oblique supports 126. The oblique supports 126 are orientated at an oblique angle relative to the longitudinal axis of the elongate vessel 110. The function of these supports is to further brace the elongate vessel 110 against lateral movement. More specifically, as the embodiment 100 is moved, for instance by a skid steer on which it is installed, it may experience rotational forces as the vehicle turns to the left or right, and these forces may tend to displace the frontal opening 114 laterally relative to the back end 112 of the embodiment 100. While the rear lateral support 124 absorbs such rotational forces, some embodiments may experience rotational forces exceeding the elastic limit of the rear lateral support 124 and/or its weld joints, or the elastic limit of the longitudinal supports 120. Therefore, in order to prevent damage to the embodiment 100 it may include optional oblique supports 126 to further absorb rotational forces. Importantly, the oblique supports 126 are optional rather than required. Furthermore, one skilled in the art will appreciate that numerous alternative bracing structures may fulfill the same function and purpose as the illustrated oblique supports 126, and the invention is not limited to the type specifically set forth here.

Still referring to FIG. 1, the longitudinal supports 120, medial lateral supports 122, rear lateral support 124, oblique supports 126 and mounting plate 130 collectively form a support frame. The elements of the frame cooperate to stiffen and stabilize the longitudinal vessel 110 to prevent flexion of the vessel 110. The frame also serves as a means for cooperating with a skid steer or other vehicle such that embodiments may be installed thereon as an accessory, and manipulated by the vehicle so that the embodiment can be loaded with and dispense cement. A variety of means for affixing the elongate vessel 110 to one or more elements of the frame are contemplated including the three straps 121 illustrated in FIG. 1 which are affixed to the fore, aft, and midsections of the vessel 110 and are attached to the frame out of view. Thus, the frame engages the elongate vessel 110 in a fixed relation. One skilled in the art will understand that a variety of alternative methodologies are well known in the art including without limitation welding or the use of mounting brackets and fasteners.

The embodiment shown in FIG. 1 also includes a chassis 111 covering an inner vessel. The chassis 111 may comprise a variety of sheeting materials including commercially available polymer sheets or sheet metal which may be formed using conventional methods. The embodiment 100 also includes a cleanout window formed in a top wall of the elongate vessel 110 near the back end 112 of the device which is covered by a door 115. The door 115 may be affixed to the vessel 110 with a set of hinges 116, for instance. The cleanout window may be used to readily access the inner volume of the vessel with a hose or other cleaning implements to remove adherent cement before it dries. Finally, FIG. 1 illustrates a chute 113 wherein an upper hemisphere of the elongate vessel 110 is omitted. A chute may be advantageous in that it may enable a workman to reach inside the device, for instance, to assist in pouring with a shovel or hoe.

FIG. 2 illustrates the embodiment 100 from a front view defined by line 2-2. The upward pitch of the elongate vessel 110 is shown. The function of the upward pitch is to more easily retain the liquid contents of the vessel 110. Furthermore, it is contemplated that embodiments having an upward pitch may cooperate with a stand located, for instance, on the ground at a work site. Accordingly, an embodiment may be placed on the stand while waiting to be installed on a skid steer or similar vehicle. One purpose for such a stand would include having a plurality of cement pouring embodiments on stands in an arc around a cement truck. The cement truck's chute may be swung from one to the next to load each device, and one or more skid steers may pick up the devices and transport them to a nearby pour site(s). Thus, in larger pour jobs cement may be poured more or less continuously as skid steers ferry cement charges to one or more nearby pour sites. This may reduce the amount of time a cement truck must be on-site by decreasing the time required to unload it.

Figure 3B:
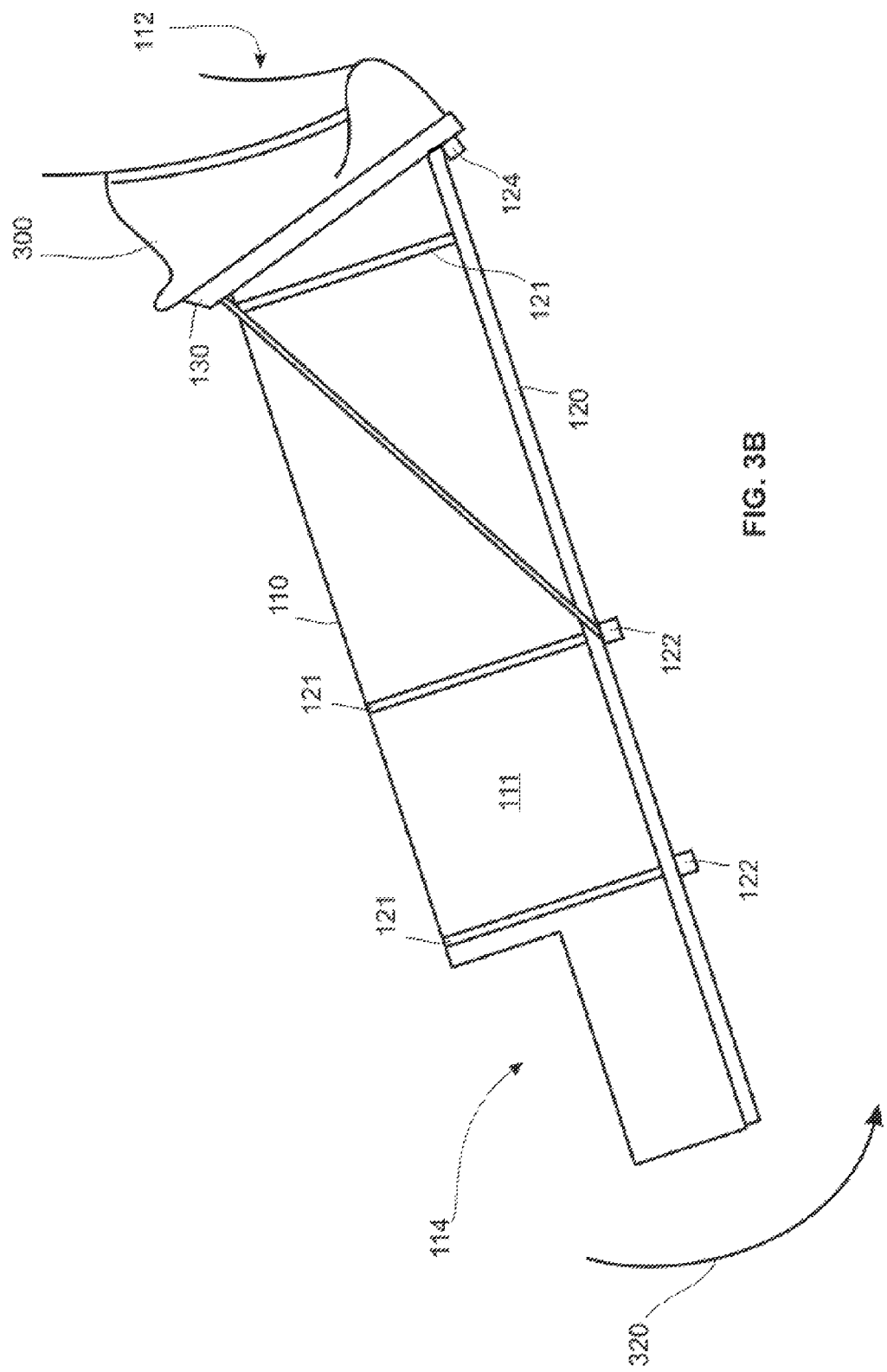
FIG. 3B is a side view of the cement pouring device of FIG. 1 according to line 3-3 of FIG. 1 where the front end of the device is tilted downward.

FIGS. 3A and 3B illustrate loading and unloading orientations of the embodiment 100. In a loading orientation the frontal opening 114 is pitched 310 upward. In this illustration the embodiment 100 is installed on the accessory mechanism 300 of a skid steer. Accordingly, the upward pitch is due in part to positioning by the skid steer; however, as explained previously, the device may also be resting on a stand which may provide the needed pitch. Also, visible in FIGS. 3A and 3B is the built-in pitch of the elongate vessel 110 relative to the mounting plate 130. As is evident from the drawings, the longitudinal axis of the elongate vessel 110 is not perpendicular to the mounting plate 130. Accordingly, when the mounting plate is in an upright orientation the frontal opening 114 of the elongate vessel 110 is actually pitched upward.

FIG. 4 is a downward view of the top fore-end of the elongate vessel corresponding to line 4-4 of FIG. 1. This view illustrates the chute 113, and also shows inner structure of the walls of the elongate vessel 110. The walls comprise a corrugated material having an inner coaxial tube to which the corrugation is bonded. The corrugation may be covered by an optional chassis 111 for aesthetic purposes. An advantage of the corrugated structure shown in FIG. 4 is that it provides significant strength while remaining light. It will be understood that one suitable structure for serving as an elongate vessel 110 is a conventional plastic culvert pipe; however, embodiments are not limited to culvert pipe and can comprise any material and/or structure having sufficient strength to support a cement load.

FIG. 5 is a bottom view of an embodiment looking upward. The underside 500 of the embodiment is visible and provides an alternative view showing the relative position of various components of the embodiment including the medial lateral supports 124, longitudinal supports 120, rear lateral support 124, oblique supports 126, and mounting plate 130.

FIGS. 6 and 7 illustrate use of the embodiment 100. In FIG. 6 the embodiment 100 is being loaded with cement 620 by the chute 610 of a cement truck 600. In FIG. 7 the embodiment 100 is shown 700 depositing a cement charge 620 in an in-ground pier form 710.

Although most of the examples shown herein illustrate an elongate vessel 110 that is essentially a right circular cylinder, the invention is not limited to such a conformation. More specifically, in another embodiment of the invention the elongate vessel may have an expanded, i.e. fatter or larger, high-volume reservoir portion near the rear mounting plate, and a skinnier portion near the frontal opening 114 forming a spout. It will be understood that the term expanded or expanding as used herein to describe a reservoir portion does not necessarily imply any particular process for manufacturing the reservoir portion, but rather is only intended to describe a relative size as compared to other portions of the elongate vessel. Such an arrangement may allow embodiments to ferry larger volumes of cement from a cement truck to a pour site. This may have several advantages including reducing the number of trips necessary to complete a job, and decreasing the time required to unload a cement truck. While irregular, such a shape can be formed according to conventional methods such as, and without limitation, by molding the vessel as a single part, molding the vessel in sections and joining the sections, heat-forming polymer sheet stock, or through conventional metal working methodologies.

In another variation of the invention described herein, an embodiment may eliminate the need for a frame. For instance, it is contemplated that the elongate vessel 110 may include built-in unitary structures for bracing the vessel against forces that would cause excessive flexion. Thus, the vessel and frame may be unitary. Moreover, the elongate vessel may include a built-in unitary mounting plate instead of a separate mounting plate 130 to which it must be joined. Thus, the vessel, frame, and mounting plate may all be combined into a single unitary part such as a molded polymer part. FIGS. 8A, 8B and 8C illustrate three conceptual overall shapes that embodiments may take on where the frame and elongate vessel are combined into a unitary structure. These drawings are not intended to show every structure of an embodiment but rather are only intended to convey the gross concept. For instance, in FIG. 8A, an elongate vessel 110 is shown having the general shape of a right circular cylinder, and the vessel 110 is braced using fins 800 arranged about the circumference of the cylinder. The fins 800 and the vessel 110 are both joined to, or unitary with, a mounting plate 130. The fins provide the stiffening effect that would otherwise be provided by the frame illustrated in FIG. 1.

In FIG. 8B the elongate vessel 110 takes on a conical form and has a spout 110a at its front end which is narrower than a reservoir portion 810 formed by the elongate vessel 110. The conical shape acts in a manner similar to the fins of FIG. 8A to provide strength. The base of the conical elongate vessel 110 is joined to, or unitary with, a mounting plate 130. In FIG. 8C another embodiment is shown where the elongate vessel 110 has an irregular shape that is roughly that of a cylinder with a narrower-diameter spout 110b at an angle relative to the vessel 110. This angle may form an upward pitch during operation of the embodiment. One skilled in the art would be capable of adapting the invention as described elsewhere herein to the alternative forms shown in FIGS. 8A, 8B, and 8C.

Moreover, it will be understood that the invention is not limited to the particular forms described herein, which are merely illustrative. It will be apparent to those skilled in the art that the above methods and apparatuses may be changed or modified without departing from the general scope of the invention. The invention is intended to include all such modifications and alterations insofar as they come within the scope of the appended claims or the equivalents thereof.

I claim:

1. A cement pouring device, comprising:
   an elongate vessel adapted to contain a wet cement mixture and having a frontal opening for dispensing the wet cement mixture; and
   a mounting plate disposed at a back end of the elongate vessel and adapted to engage a lift vehicle, wherein the mounting plate encloses the backend of the elongate vessel, and wherein the frontal opening of the elongate vessel is pitched upward relative to the mounting plate, by a longitudinal axis of the elongate vessel being non-perpendicular to the mounting plate.

2. The device of claim 1, wherein the mounting plate and the elongate vessel form a unitary structure.

3. The device of claim 1, further comprising a support frame adapted to engage the elongate vessel in a fixed relation and adapted to stiffen the elongate vessel against flexion.

4. The device of claim 3, wherein the support frame and elongate vessel form a unitary structure.

5. The device of claim 1, wherein the elongate vessel further comprises a reservoir portion at a rear of the elongate vessel, the reservoir portion being adapted to provide extra cement holding capacity by expanding the elongate vessel at the reservoir portion with respect to a volume of the frontal opening.

6. The device of claim 1, wherein the elongate vessel further comprises a cleanout window disposed in a top wall of the elongate vessel.

7. The device of claim 6, further comprising a cover attachable to the elongate vessel and adapted to close the cleanout window.

8. The device of claim 3, wherein the support frame includes a pair of longitudinal support beams spaced apart to form a pocket adapted to receive the elongate vessel and adapted to stiffen the elongate vessel against lateral flexion perpendicular to a longitudinal axis of the elongate vessel.

9. The device of claim 8, wherein the support frame includes a plurality of lateral supports perpendicular to the longitudinal supports and tying the longitudinal supports together.

10. The device of claim 9, wherein the plurality of lateral supports comprise medial lateral supports disposed about a midsection of the elongate vessel.

11. The device of claim 9, wherein the plurality of lateral supports comprise at least one rear lateral support joined to the mounting plate and defining a ledge vertically supporting the longitudinal supports, wherein the longitudinal supports are joined to the rear lateral support.

12. The device of claim 9, wherein the plurality of lateral supports comprise at least one rear lateral support joined to the mounting plate and forming a T joint with an end of each longitudinal support.

13. The device of claim 9, wherein the plurality of lateral supports comprise at least one rear lateral support joined to the mounting plate and forming a unitary T with each longitudinal support.

14. The device of claim 9, wherein the plurality of lateral supports comprise a pair of rear lateral supports formed by the longitudinal supports extending away from a longitudinal axis of the elongate vessel at right angles thereby forming an L-shape, and wherein the rear lateral supports are joined to the mounting plate.

15. The device of claim 9, further comprising a pair of oblique supports each having one end joined to an end of a lateral support, and an end joined to the mounting plate, and wherein each oblique support is oriented at an oblique angle relative to a longitudinal axis of the elongate vessel.

16. The device of claim 1, wherein the elongate vessel comprises a pair of coaxial tubes spaced apart by a medial corrugated support structure, wherein the medial corrugated support structure is joined to at least one of the pair of coaxial tubes.

17. The device of claim 1, wherein the frontal opening includes a chute, the chute having an upper hemisphere of the elongate vessel omitted.

18. A cement pouring device, comprising:
    an elongate vessel adapted to contain a wet cement mixture and having a frontal opening for dispensing the wet cement mixture;
    a support frame adapted to engage the elongate vessel in a fixed relation, and adapted to be mounted on a lift vehicle; and
    a mounting plate disposed at a rear of the device and adapted to reversibly engage a skid steer such that the skid steer may carry the device, wherein the mounting plate encloses the backend of the elongate vessel, and wherein the frontal opening of the elongate vessel is pitched upward relative to the mounting plate by a longitudinal axis of the elongate vessel being non-perpendicular to the mounting plate.

19. A cement pouring device, comprising:
    an elongate vessel adapted to contain a wet cement mixture and having a frontal opening for dispensing the wet cement mixture;
    a support frame adapted to engage the elongate vessel in a fixed relation, and adapted to be mounted on a lift vehicle, wherein the support frame includes a pair of longitudinal support beams spaced apart to form a pocket adapted to receive the elongate vessel and adapted to stiffen the elongate vessel against lateral flexion perpendicular to a longitudinal axis of the elongate vessel, and wherein the support frame includes a plurality of lateral supports perpendicular to the longitudinal supports and tying the longitudinal supports together;
    a mounting plate disposed at a rear of the device and adapted to reversibly engage a skid steer such that the skid steer may carry the device, wherein the mounting plate encloses the backend of the elongate vessel, and wherein the frontal opening of the elongate vessel is pitched upward relative to the mounting plate by a longitudinal axis of the elongate vessel being non-perpendicular to the mounting plate; and
    a pair of oblique supports each having one end joined to an end of a lateral support, and an end joined to the mounting plate, and wherein each oblique support is oriented at an oblique angle relative to a longitudinal axis of the elongate vessel.

* * * * *